March 21, 1967     L. RIPPER     3,310,737
DEVICE FOR ACCURATELY MEASURING VERY HIGH RESISTANCES Filed Nov. 4, 1963     2 Sheets-Sheet 1

INVENTOR.
Ludvík Ripper
BY

March 21, 1967 L. RIPPER 3,310,737
DEVICE FOR ACCURATELY MEASURING VERY HIGH RESISTANCES
Filed Nov. 4, 1963 2 Sheets-Sheet 2

INVENTOR.
Ludvik Ripper
BY
Richard Low
Ag't

United States Patent Office 3,310,737
Patented Mar. 21, 1967

3,310,737
DEVICE FOR ACCURATELY MEASURING
VERY HIGH RESISTANCES
Ludvík Ripper, Brno, Czechoslovakia, assignor to Tesla, narodni podnik, Prague, Czechoslovakia
Filed Nov. 4, 1963, Ser. No. 321,107
Claims priority, application Czechoslovakia, Nov. 5, 1962, 6,231/62; Sept. 17, 1963, 5,123/63
5 Claims. (Cl. 324—62)

This invention relates to very high resistance measuring devices. More particularly, it relates to a device of high accuracy capable of effecting semi-automatic resistance measuring in the range from $10^6$ to $10^{16}$ ohms.

Very high resistances are generally measured by a method which is based upon the principle of discharging a standard capacitance through the resistance being measured. The disadvantages presented by this method result from the relatively low accuracy thereof which is further decreased by the leakage resistance of the capacitance standard, the voltmeter resistance, and parasitic capacitance.

An improved high resistance measuring method and arrangement is described in Review of Scientific Instruments, 1954, III, pp. 251–255. According to this method, there is employed a constant polarity voltage source with a helical potentiometer connected thereto, the voltage having a constant time derivative, the slider of the potentiometer being driven by a uniform velocity motor. This arrangement presents the disadvantages that such voltage source permits the achieving of only a relatively low accuracy because of nonlinearities in the helical potentiometer and the inaccuracy of the uniformity of the motor velocity, the limited time derivative range of the constant polarity voltage and the time loss caused by the necessity of returning the potentiometer to the starting position during the measuring.

Accordingly, it is an important object of this invention to provide an improved very high resistance measuring device which enables a semiautomatic measuring with a substantially greater accuracy and speed of a wide range of resistances than known devices for the same purpose are capable of.

In accordance with the invention, there is provided a very high resistance measuring device which comprises a first unidirectional voltage source, and a difference amplifier, a resistance to be measured being connected between the first source and the input to the difference amplifier. There are further provided a second and adjustable unidirectional voltage source, a first D.C. amplifier, an integrating resistance connected between the second source and the input of the D.C. amplifier, a first capacitance connected between the output of the D.C. amplifier and the junction of the resistance to be measured and the input of the difference amplifier and a second and integrating capacitance connected across the D.C. amplifier. The magnitude of the voltage from the second source is chosen such that it satisfies the relation $$U_2 = \frac{R_2}{R_1} \cdot \frac{C_2}{C_1} \cdot U_1$$

when the voltage at input to the difference amplifier is zero wherein $U_1$ is the voltage supplied to the resistance to be measured from the first source, $R_1$ is the value of the resistance to be measured, $R_2$ is the value of the integrating resistance, $C_2$ is the value of the second and integrating capacitance, $C_1$ is the value of the first capacitance, and $U_2$ is the value of the voltage from the second source, the current flowing into the difference amplifier from the first source through the resistance to be measured being balanced by the current flowing from the second source into the difference amplifier through the integrating resistance, the D.C. amplifier and the second capacitance.

For a better understanding of the invention, together with other and further objects thereof reference is had to the following description taken in conjunction with the accompanying drawing and its scope is poined out in the appended claims.

Figure 1:
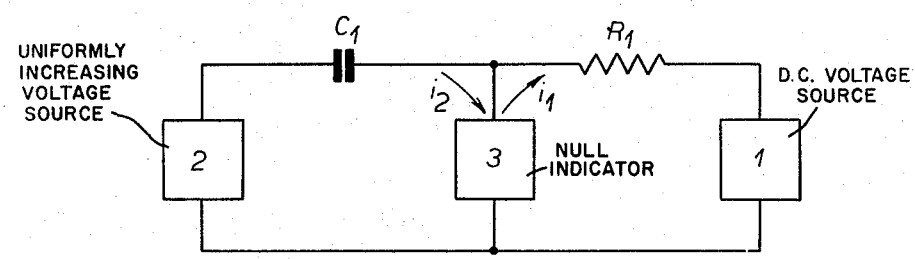
FIG. 1 is a block diagram of a known high resistance measuring device.

Referring now to FIG. 1 wherein there is shown a known device for measuring high resistances, the principle of operation of this device is the compensation of the current $i$, from a D.C. voltage source 1 and flowing in null indicator 3 across resistance $R_1$ to be measured by the current $i_2$. Current $i_2$ is opposite in polarity to that of current $i_1$ and flows through capacitance $C_1$ which is connected between the source of uniformly increasing voltage 2 and null indicator 3. Capacitance $C_1$ is a three terminal standard capacitance and uniformly increasing voltage source 2 comprises a helical potentiometer connected to a D.C. voltage, the slider of the potentiometer being driven by a motor of uniform speed. As has been mentioned herein above, source 2, of necessity, permits only the attaining of a relatively low accuracy caused by the helical potentiometer nonlinearities, the non-uniform motor velocity, the limited time derivative of an increasing voltage with a constant polarity, and the time loss caused by the necessity of returning the potentiometer to the starting position during the measuring.

Figure 2:
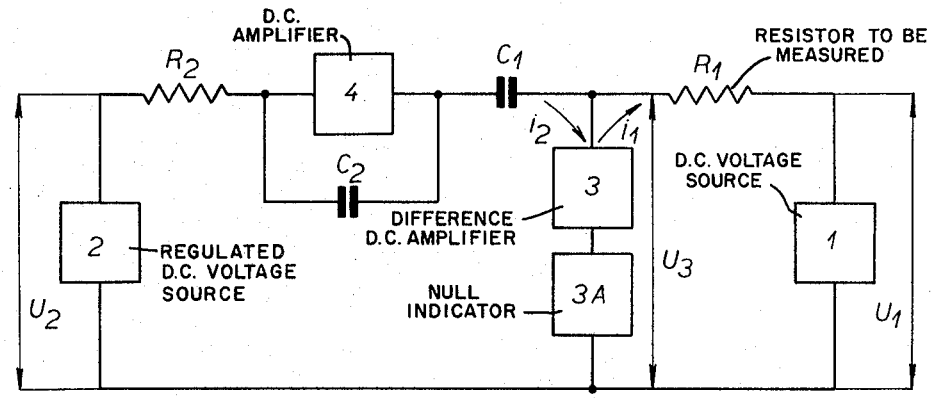
FIG. 2 is a diagram, essentially in block form, of an illustrative embodiment of a high resistance measuring device constructed in accordance with the principles of the invention.

Referring now to FIG. 2 wherein there is shown an illustrative embodiment of a device constructed according to the invention, the resistance $R_1$ to be measured is connected between a D.C. voltage source 1 and the input of a difference D.C. amplifier 3. The output of amplifier 3 is applied to a null indicator 3A. A terminal of a capacitance, $C_1$ is connected to the junction of resistance, $R_1$ and amplifier 3. The other terminal of capacitance, $C_1$ being connected to the output of a source of regulated uniformly increasing voltage 2 with an adjustable time derivative. The latter source is provided by the regulated adjustable D.C. voltage source 2, the resistance $R_2$, the capacitance $C_2$ and the amplifier 4.

In the operation of the device of FIG. 2, the current $i$, flowing through the input circuit of difference amplifier 3 from source 1 across resistor $R_1$ is balanced by the current $i_2$, the magnitude of the current $i_2$ being controlled through the appropriate varying of the voltage from source 2. If amplifier 4 is chosen to have a relatively high amplification, then the magnitude of the value of current $i_2$ is determined by the voltage $U_2$, the resistance $R_2$ and the capacitance relation $C_1 : C_2$. If $$i_1 = i_2$$

the voltage $U_3$ at the input of difference amplifier 3 is equal to zero. Since $$i_1 = \frac{U_1}{R_1}$$

the value of resistance $R_1$ can be determined by the relation $$R_1 = R_2 \cdot \frac{C_2}{C_1} \cdot \frac{U_1}{U_2}$$

Figure 3:
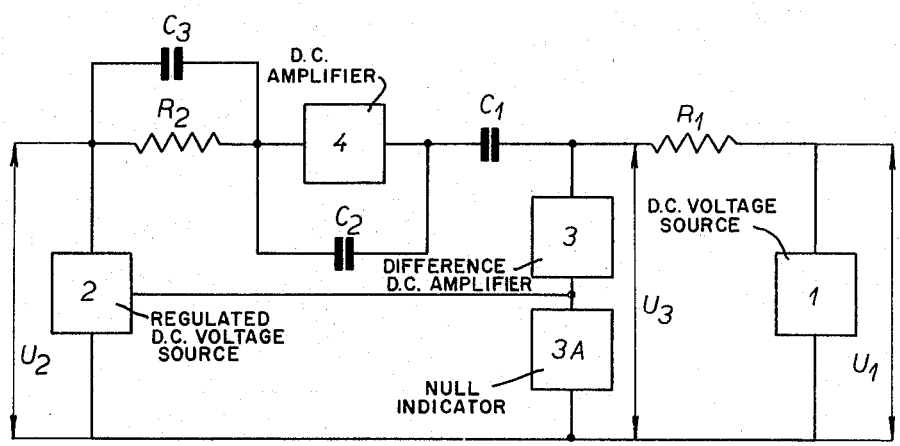
FIG. 3 is a diagram similar to that of FIG. 2 and illustrates a modification of the device shown in FIG. 2.

The device of FIG. 3 differs from that of FIG. 2 in that the output of difference amplifier 3 is applied to regulated D.C. voltage source 2 i.e. the regulating current therefor and a capacitance $C_3$ is provided across resistance $R_2$.

In the arrangement shown in FIG. 3, voltage $U_3$ has a constant zero value only when the following condition for voltage $U_2$ is fulfilled:

$$U_2 = \frac{R_2}{R_1} \cdot \frac{C_2}{C_1} \cdot U_1$$

To measure the resistance $R_1$, the values of resistance $R_2$, capacitances $C_1$ and $C_2$, and voltage $U_1$ can be selected. Thus, the voltage $U_2$ is suitably selected either manually or by a servomechanism to have a value such that a constant zero voltage is produced across the terminals of difference amplifier 3. With the formula set forth immediately hereinabove, it is possible to calculate the value of the resistance $R_1$ to be measured or the conductance, i.e., the reciprocal of the resistance value. It may be more convenient to provide the conductance value since, with the proper selection for the values of resistance $R_2$, capacitance $C_1$ and capacitance $C_2$, the conductance of the measured resistance may be directly calculated from the value of voltage $U_2$ from the ratio $U_2/U_1$ by the relation $$C_1 = \frac{1}{R_1} = \frac{U_2}{U_1}\left(\frac{1}{R_2} \cdot \frac{C_1}{C_2}\right)$$

Figure 4:
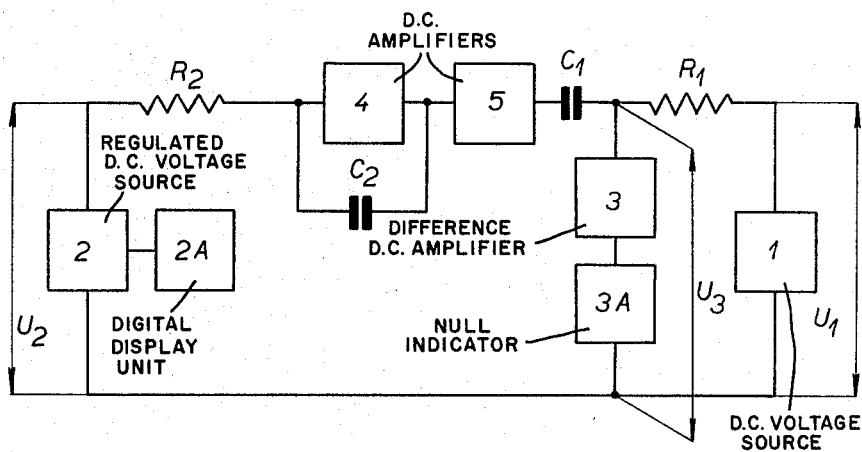
FIG. 4 is a diagram similar to that of FIG. 2 and illustrates another modification of the device shown in FIG. 2.

The device shown in FIG. 4 differs from that shown in FIG. 2 in that a digital display unit 2A is provided at the output of regulated D.C. voltage source 2, and a second D.C. amplifier 5 is provided between D.C. amplifier 4 and capacitance $C_1$. Digital display unit 2A may be utilized to provide a digital indication of the output voltage $U_2$ or of the value resulting from the ratio $U_2/U_1$. The digital indication may be used for digital measurement of the conductance of the measured resistance.

The device shown in FIGS. 1, 2 and 3 may suitably be employed to measure resistances having values of from $10^6$ to $10^{16}$ ohms.

In the device of FIG. 3, in the situation where voltage $U_3$ is not zero, the latter voltage can be controlled by difference amplifier 3. In the measuring resistances having respective value of $10^{12}$ ohms and greater, capacitance 3 is connected across resistance $R_2$ to enable a more rapid attainment of a zero value for voltage $U_3$, particularly where the voltage of source 2 is automatically adjustable. The value of capacitance 3 is not critical since it does not enter into the measurement of unknown resistance $R_1$ but affects only the speed of such measurement.

In the device shown in FIG. 4, amplifier 5 is chosen to have a capacitance which is less than 100 pf. Such arrangement is particularly suitable in the situation in which a three terminal standard capacitance which has a high parasitic capacitance $C_p$ (shown in broken line) against a shielding cover is employed as capacitance $C_1$.

In the arrangements shown in FIGS. 1 to 3, it is possible that the connecting of the parallel capacitance between the output of amplifier 4, which is an integrator amplifier, and the null voltage may result in oscillations or linearity deterioration of the output voltage of the integrator amplifier. Such possibility is eliminated by the arrangement according to FIG. 4 since there is prevented therein the affecting of the function of the linearly increasing voltage source by the parasitic capacitance $C_p$ of capacitance $C_1$ and the enabling therein of the use of a three-terminal capacitance of any design in the measuring circuit.

The device described herein according to the invention may be advantageously used for the accurate production control of high-value resistors in their manufacture.

While there have been described what are considered to be preferred embodiments of this invention, it will be obvious to those skilled in the art that various changes and modifications may be made therein without departing from the invention and it is accordingly intended in the appended claims to cover all such modifications as fall within the spirit and scope of the invention.

What I claim is:

1. A very high resistance measuring device comprising a difference amplifier having a pair of inputs and an output, a first unidirectional voltage source, a resistance to be measured being connected between one end of said first source and one of the inputs of said difference amplifier, a second and regulated adjustable unidirectional voltage source, a first D.C. amplifier, an integrating resistance connected between one end of said second source and the input of said D.C. amplifier, a first capacitance connected between the output of said D.C. amplifier and the junction of said resistance to be measured and the input of said difference amplifier, means for connecting the other ends of the sources and the other input of said difference amplifier together, indicating means connected to the output of said difference amplifier, and a second and integrating capacitance connected across said D.C. amplifier, the magnitude of the voltage from said second source being chosen such that it satisfies the relation $$U_2 = \frac{R_2}{R_1} \cdot \frac{C_2}{C_1} \cdot U_1$$

when the voltage input to said difference amplifier is zero wherein $U_1$ is the voltage supplied to the resistance to be measured from said first source, $R_1$ is the value of said resistance to be measured, $R_2$ is the value of said integrating resistance, $C_2$ is the value of said second and integrating capacitance, $C_1$ is the value of said first capacitance and $U_2$ is the value of the voltage from said second source, the current flowing into said difference amplifier from said first source through said resistance to be measured being balanced by the current flowing from said second source into said difference amplifier through said integrating resistance, said D.C. amplifier and said second capacitance.

2. A very high resistance measuring device as defined in claim 1 wherein the output of said difference amplifier is connected to said source to influence its regulation.

3. A very high resistance measuring device as defined in claim 1 wherein a third capacitance is further included connected across said integrating resistance.

4. A very high resistance measuring device as defined in claim 1 and further including digital display means in circuit with said second source for displaying the voltage from said source.

5. A very high resistance measuring device as defined in claim 1 and further including a second D.C. amplifier connected between said first D.C. amplifier and said first capacitance, said second D.C. amplifier having an input capacitance of less than 100 pf.

References Cited by the Examiner

UNITED STATES PATENTS 2,649,571    8/1953    Smith _____ 324—57

WALTER L. CARLSON, *Primary Examiner.*

W. H. BUCKLER, E. E. KUBASIEWIEZ,
                   *Assistant Examiners.*